(12) United States Patent
Eichhorn

(10) Patent No.: US 10,582,043 B1
(45) Date of Patent: Mar. 3, 2020

(54) METHOD OF IDENTIFYING INSTANCES OF INTERNATIONAL CALL INTERCONNECT BYPASS TELECOMMUNICATIONS FRAUD

(71) Applicant: Syniverse Technologies, LLC, Tampa, FL (US)

(72) Inventor: Matthias Eichhorn, Worms (DE)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/267,795

(22) Filed: Feb. 5, 2019

(51) Int. Cl.
| | |
|---|---|
| *H04M 1/66* | (2006.01) |
| *H04M 3/42* | (2006.01) |
| *H04M 3/436* | (2006.01) |
| *H04M 1/57* | (2006.01) |
| *H04M 7/00* | (2006.01) |

(52) U.S. Cl.
CPC ....... *H04M 3/42059* (2013.01); *H04M 1/573* (2013.01); *H04M 1/575* (2013.01); *H04M 7/0078* (2013.01)

(58) Field of Classification Search
None
See application file for complete search history.

(56) References Cited

U.S. PATENT DOCUMENTS

| | | | | |
|---|---|---|---|---|
| 6,335,971 B1* | 1/2002 | Springer | ............... | H04M 15/47 379/144.01 |
| 6,396,915 B1* | 5/2002 | Springer | ............... | H04M 15/47 379/114.14 |
| 6,404,865 B1* | 6/2002 | Springer | ............... | H04M 15/47 379/114.14 |
| 6,404,871 B1* | 6/2002 | Springer | ............... | H04M 1/677 379/144.01 |
| 6,556,669 B2* | 4/2003 | Marchand | ............... | H04M 3/38 379/114.04 |
| 7,760,862 B2* | 7/2010 | Marchand | ............... | H04M 3/38 379/114.04 |
| 8,654,948 B2* | 2/2014 | Dement | ............... | H04M 3/38 379/114.14 |
| 2003/0048889 A1* | 3/2003 | Marchead | ............... | H04M 3/38 379/114.14 |
| 2007/0121886 A1* | 5/2007 | Marchand | ............... | H04M 3/38 379/219 |

\* cited by examiner

*Primary Examiner* — Harry S Hong
(74) *Attorney, Agent, or Firm* — Andriy Lytvyn; Smith & Hopen, P.A.

(57) ABSTRACT

A cross-network call identifying function for identifying instances of international call interconnect bypass telecommunications fraud. The cross-network call identifying function access call detail records of both the terminating network and the originating network. The cross-network call identifying function identifies an outgoing international phone call from a caller within the originating network to a callee within the terminating network. The call detail records of the terminating network are querried for an incoming call with a matching callee call identifier. Time information of the outgoing call and the incoming call are compared to determine whether there is a match. If the callee call identifiers and time information match, but the incoming phone call is recorded as a local call, then the incoming call is identified as an instance of international call interconnect bypass fraud.

17 Claims, 2 Drawing Sheets

METHOD OF IDENTIFYING INSTANCES OF INTERNATIONAL CALL INTERCONNECT BYPASS TELECOMMUNICATIONS FRAUD

BACKGROUND OF THE INVENTION

1. Field of the Invention

This invention relates generally to the field of telecommunications networks.

Specifically, the invention pertains to a method of identifying instances of interconnect bypass telecommunications fraud associated with unlawful international call termination.

2. Brief Description of the Related Art

Telecommunications fraud is estimated to amount to tens of billions of dollars a year globally. The funds obtained through telecommunication fraud are often used to finance illegal activities, including terrorism. Thus, telecommunications fraud is a multi-faceted global problem, which demands an immediate solution.

One type of telecommunications fraud is international phone call interconnect bypass.

When an international call is placed from a caller to a callee, a minimum of three telecommunications network operators are involved: an originating network operator, a terminating network operator, and one of more transit operators. When a caller within the originating network places a phone call to a callee in the terminating network, the transit operators route the call from originating network operator to terminating network operator, thus establishing a connection link between the originating network and the terminating network.

Billing charges associated with the international phone call are collected by the originating network and are distributed among the originating network operator, the terminating network operator, and the interconnecting network operators. A significant portion of the billing charges is attributed to the international termination fee, which the terminating network collects when the call is properly routed. The terminating network may also be entitled to a roaming fee, if the callee is roaming.

In some cases, one of the interconnecting network operators may employ fraudulent schemes to defraud the terminating network operator of the international call termination fee. In such schemes, one of the transit operators injects the phone call into the terminating network without routing the call to the terminating network operator—hence the name "interconnect bypass" fraud. The injected phone call is then routed to the callee as a local call within the terminating network. In this scheme, the transit operator injecting the call into the terminating network collects the international call termination fee.

One example of an international call interconnect fraud scheme involves routing the international call to a Subscriber Identity Module (SIM) card within the terminating network and then connecting the call to the callee, as if the call were a local phone call rather than an international phone call. In this scheme, fraudsters commonly use SIM-boxes and/or compromised Private Branch Exchanges (PBXs) to inject international calls into the callee network without using the predefined interconnection points. SIM-box fraud often uses stolen SIM cards or abuses SIM cards with cheap voice plans inside a SIMbox. The SIMbox is used to establish a gateway between Voice over Internet Protocol (VoIP) and Global System for Mobile communications (GSM) to inject international calls into the local telecommunications network. An estimated annual revenue loss for the bypassed network operator is approximated to be around \$6 billion.

It is difficult for the bypassed terminating operator to accurately measure the traffic that is being diverted from its network. By analyzing its call detail records (CDRs), the bypassed operator can observe a decrease in the incoming international call traffic and can identify discrepancies in the projected revenue generated from international call termination fees and the actual revenue. Although these indicators can alert the bypassed network operator that it is being a victim of interconnect bypass fraud, these indicators alone do not provide a reliable measurement of the extent of the fraud and, more importantly, lack information needed to identify the transit operator that is committing the bypass fraud.

A common type of a technique used in an attempt to detect interconnect bypass fraud is known as rule-based fraud detection. This technique relies on an analysis of call behavior of connected SIM cards and/or PBXs to identify predefined anomalies. Such anomalies can include the following: high divergency of call directions while no or almost no incoming calls are observed; a large number of calls in a consecutive sequence with only short inactivity periods; geographical stationarity; and rules used to identify cloned SIM cards. The rule-based techniques have several significant flaws, which greatly limit their efficacy. For example, transit operators committing interconnect bypass fraud quickly change their call behavior when they determine that they are being observed by a detection mechanism. Fraudsters also often combine multiple means to disguise their fraudulent activity including frequently switching SIM cards, using multiple compromised PBXs, and using the SIM cards and PBXs in a way that avoids a detectable pattern. Even when compromised SIM cards and PBXs are identified, the fraudsters often quickly disconnect those SIM cards, clean compromised PBXs, thereby making identification of the bypassing transit operator extremely difficult.

Another example of a technique aimed at identifying interconnect bypass fraud involves using test calls. This technique involves a Test Call Generation (TCG) platform. TCG platforms provide call origination points worldwide, from various networks in various countries. Using a TCG platform, a terminating network operator can generate calls to its own network from various originating networks in the world. This technique enables the terminating network to receive some insight into how various interconnecting operators route the calls to its network and detect when an international phone call is not being routed properly. One limitation of this technique is that the TCG platforms are expensive and often offer inflexible packaged services, making them cost prohibitive for many operators. Another limitation of this technique is associated with fraudsters' ability to distinguish between generated test calls and actual organic phone calls between callers and callees. This ability enables fraudsters to route the generated test calls according to the proper interconnection scheme to avoid detection, while engaging in interconnect bypass with respect to the actual phone calls.

Thus, what is needed is a method of enabling the terminating network operator to identify the phone calls that have been subjected to interconnect bypass telecommunications fraud.

SUMMARY OF THE INVENTION

In an embodiment, the invention pertains to a cross-network call identifying function (CNCIF) for identifying instances of international call interconnect bypass telecommunications fraud. When an international call is placed from a caller within an originating network to a callee within a terminating network, the phone call is routed by a plurality of transit operators. In some instances, one of the plurality of transit operators fraudulently terminates an international phone call within the terminating network without routing the phone call to the terminating network operator. In this scheme, the fraud perpetrator collects the international termination fee, thereby defrauding the terminating network operator. This fraudulent scheme is known as international call interconnect bypass.

The CNCIF has access to call detail records (CDRs) of both the terminating network and the originating network. In an embodiment, the CNCIF establishes a network connection with a first server having the CDR of the originating telecommunications network stored thereon. The CNCIF accesses the CDR and identifies therein an outgoing call from the caller registered in the originating telecommunications network to the callee registered in the terminating telecommunications network. The callee has a first identifier associated therewith.

The CNCIF also establishes a network connection with a server having a CDR of the terminating telecommunications network stored thereon. The CNCIF accesses the CDR and queries it for a record of an incoming call corresponding to the first identifier of the callee.

If the CNCIF identifies, within the CDR of the terminating network, a record of the incoming call corresponding to the first identifier of the callee, the CNCIF determines whether the incoming call is recorded within the terminating network CDR as a local call or an international call. If the incoming phone call is recorded as an international call, then it is a properly connected international call. However, if the incoming call in the terminating network CDR is recorded as a local call, the CNCIF identifies the incoming call as an instance of the international call interconnect bypass telecommunications fraud. In an embodiment, the CNCIF automatically transmits a communication to a network administrator notifying the network administrator of the instance of the international call interconnect bypass telecommunications fraud associated with the incoming call.

In an embodiment, prior to identifying the incoming call as the instance of the international call interconnect bypass telecommunications fraud, the CNCIF verifies whether time information corresponding to the outgoing call matches time information corresponding to the incoming call. This can be accomplished by obtaining, from the originating network CDR, the time information corresponding to the outgoing call and obtaining, from the terminating network CDR, the time information corresponding to the incoming call, and determining whether the time information corresponding to the outgoing call matches the time information corresponding to the incoming call.

In an embodiment, the CNCIF analyzes the identified instances of interconnect bypass fraud and identifies the transit operator committing the fraud. This functionality can be achieved by analyzing multiple instances of the international call interconnect bypass telecommunications fraud and identifying the transit operator that is involved in a threshold number of instances of interconnect bypass fraud. The identified transit operator can be automatically blacklisted from routing subsequent international phone calls.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1A:
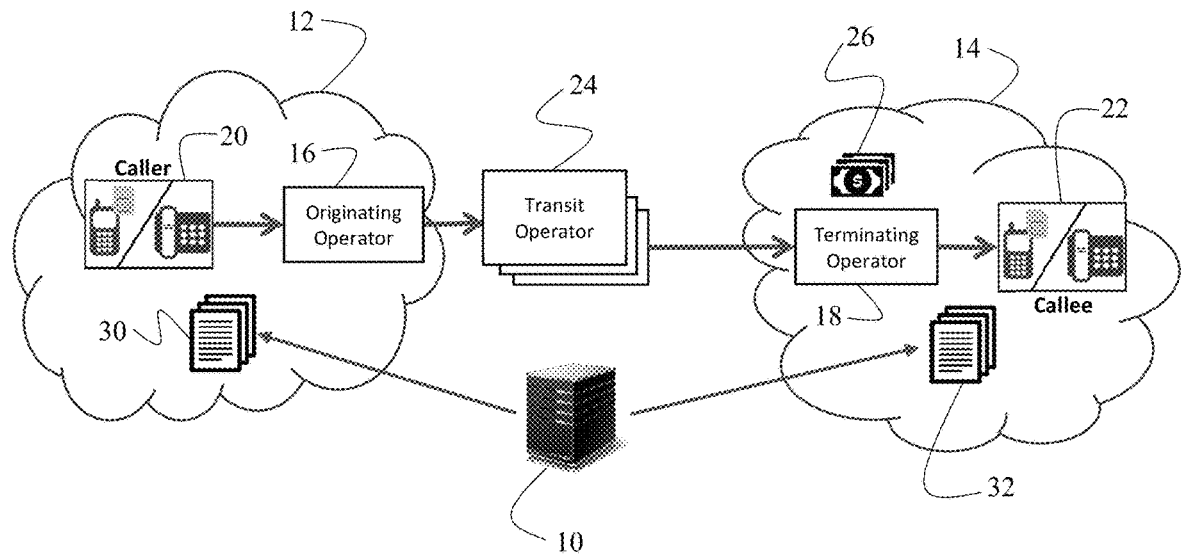
FIG. 1A is a diagram schematically depicting the architecture of an embodiment of the invention, wherein an international phone call is properly routed.
Figure 1B:
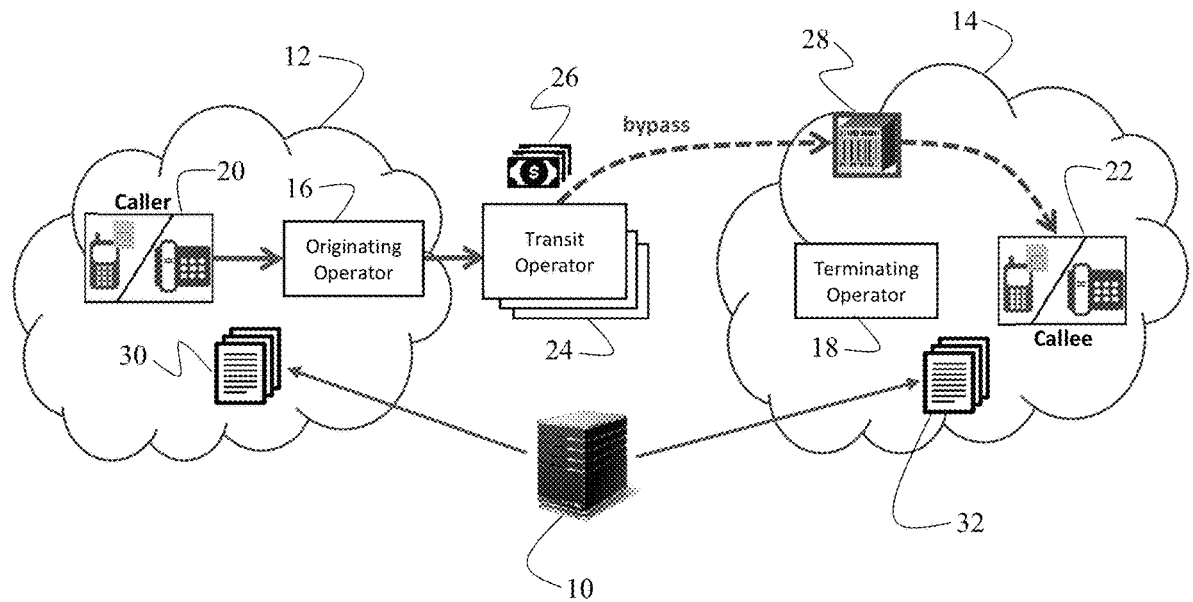
FIG. 1B is a diagram schematically depicting the architecture of an embodiment of the invention, wherein an instance of international call interconnect bypass occurs.

The invention pertains to a system and a method of detecting instances of interconnection bypass telecommunications fraud. Referring to FIGS. 1A-1B, a cross-network call identifying function (CNCIF) 10 is in communication with an originating telecommunications network (O-Network) 12 and a terminating telecommunications network 14 (T-Network). O-Network is operated by originating operator 16, and T-Network is operated by terminating operator 18. O-Network 12 and T-Network 14 are located in different countries.

As depicted in FIG. 1A, a caller 20 is registered within O-Network 12. When caller 20 places an international phone call to a callee 22 registered within T-Network 14, the phone call is routed from originating operator 16 to terminating operator 18 by one or more transit operators 24. Transit operators 24 establish a connection link between O-Network 12 and T-Network 14. When terminating operator 18 connects the phone call to callee 22, terminating operator 18 collects international call termination fee 26. This is the proper way of connecting international phone calls.

Because international call termination fees 26 tend to be relatively high, international phone calls constitute an attractive target for criminal entities engaged in telecommunications fraud. As depicted in FIG. 1B, some international phone calls are not routed via terminating operator 18. Instead, one of transit operators 26 bypasses terminating operator 18 and injects the phone call into T-Network 14 using a compromised SIM card, SIMbox, PBX, or VoIP means 28, rather than routing the phone call via predefined interconnection points. From SIM card, SIMbox, PBX, or VoIP means 28 the international phone call is routed to callee 22 as a local call within T-Network 14. Because transit operator 24 terminated the phone call within T-Network 14, transit operator 14—rather than terminating operator 18—collects international call termination fee 26. This scheme constitutes international call bypass fraud.

The international call bypass fraud is very difficult to detect. Because the phone call reaches callee 22, caller 20 and callee 22 are able to participate in the phone call with each other without being aware that the phone call was improperly routed. Likewise, neither originating operator 16 nor terminating operator 18 can independently identify that a particular international phone call was subjected to bypass fraud. Terminating operator 18 can become generally aware that it is being a victim of international call bypass fraud by observing a decrease in the quantity of incoming international phone calls and a decrease in revenue generated from collecting international termination fees 26. However, terminating operator 18 cannot pinpoint the exact phone calls that were subjected to bypass fraud, thereby making it difficult to identify the fraudster within the plurality of transit operators 24.

Originating operator 16 generates call detail records (CDRs) 30, which record all outgoing calls that originate from O-Network 12. Likewise, terminating operator 18 generates CDRs 32, which record all incoming calls within T-Network 14. CDRs 30 and 32 may contain the following attributes: call identifier (e.g., the phone number) of caller 20; the call identifier of callee 22; the route by which the call entered the exchange, including listing of transit operators 24; call type (local vs. international); the starting time of the call (date and time); call duration; the billing phone number that is charged for the call; the identification of the telephone exchange or equipment writing the record; a unique sequence number identifying the record; additional digits on the called number used to route or charge the call; disposition or the results of the call, indicating, for example, whether or not the call was connected; any fault condition encountered.

As depicted in FIGS. 1A-B, cross-network call identifying function (CNCIF) 10 has access to the servers hosting CDR 30 of O-Network 12 and CDR 32 of T-Network 14. CNCIF 10 is configured to leverage the information contained within CDR 30 and CDR 32 to identify phone calls from callers 20 in O-Network 12 to callees 22 in T-Network 14 that constitute instances of international call interconnect bypass fraud.

Figure 2:
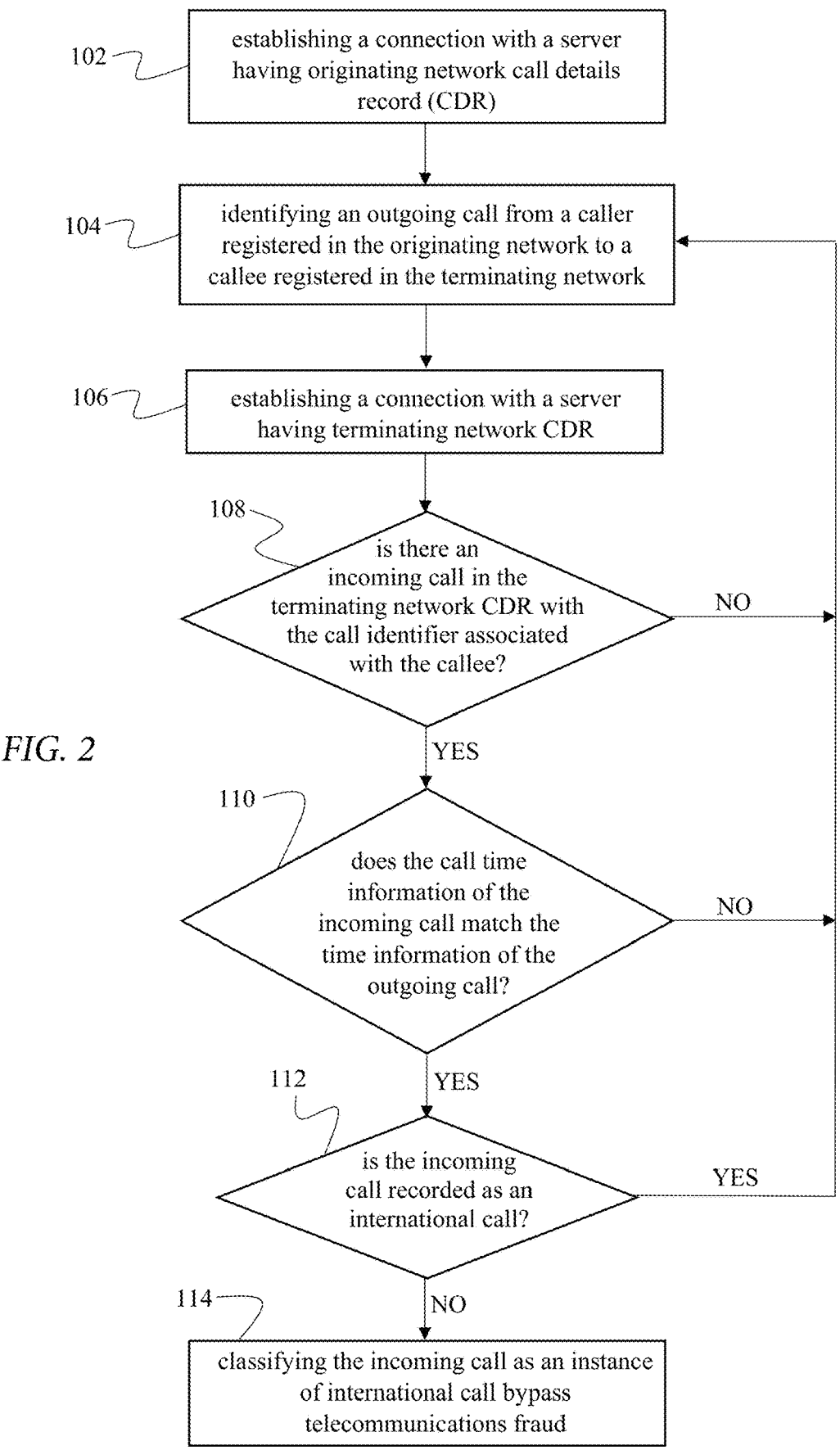
FIG. 2 is a flow chart schematically depicting a method of identifying instances of international call interconnect bypass and transit operator committing the fraud.

Referring to FIG. 2, in step 102, CNCIF 10 establishes a first network connection with a first server hosting CDR 30 of O-Network 12. In step 104, CNCIF 10 identifies an outgoing call from caller 20 registered within O-Network 12 to callee 22 registered within T-Network 14. Callee 22 can be identified by a call identifier associated therewith. In an embodiment, call identifiers may be publicly known mobile or fixnet telephone numbers.

In step 106, CNCIF 10 establishes a second network connection with a second server hosting CDR 32 of T-Network 14. Next, in step 108, CNCIF 10 queries CDR 32 to determine whether CDR 32 contains a record of an incoming phone call to callee 22. For example, if O-Network 12 is in Brazil and T-Network 14 is in the United States, CNCIF 10 will access CDR 30 of Brazilian network operator and will identify an outgoing call from a Brazilian caller 20 to a United States callee 22. Callee 22 will have a certain call identifier associated therewith. Next, CNCIF 10 will query CDR 32 of the U.S. network operator to identify an incoming call having the call identifier of callee 22. If the same callee identifier is present in both an outgoing call in CDR 30 and incoming call in CDR 32, such phone call becomes a candidate for a possible matched call from O-Network 12 to T-Network 14.

For bypassed calls, the call identifier of caller 20 may differ in CDR 30 and CDR 32. Thus, this attribute may not be a reliable means of verifying whether the candidate call is indeed a phone call from caller 20 within O-Network 12 to callee 22 within T-Network 14. For this reason, CNCIF 10 utilizes call time information to verify whether the candidate call identified in step 108 is a matching call. To this end, in step 110, CNCIF 10 compares the call time information of the outgoing call in CDR 30 and the time information of the incoming call in CDR 32, wherein both the outgoing call and the incoming call have a matching callee identifier, as established in step 110. Examples of call time information recorded within CDRs 30 and 32, include the following: the start time of the call, the end time of the call, and the duration of the call. If the call information in both CDRs 30 and 32 matches, then the candidate phone call is categorized as a matching call.

In step 112, CNCIF 10 examines CDR 32 of T-Network 14 to determine whether the incoming call is recorded in CDR 32 as an international call or a domestic call. If the call is recorded as an international phone call from a caller 20 in O-Network 12, then this matching phone call is a properly terminated international phone call without bypass fraud. On the other hand, if the matching phone call is recorded as a local phone call in CDR 32, then CNCIF 10 concludes that bypass fraud had been committed with respect to this phone call. Because the phone call is recorded in CDR 30 of O-Network 12 as an international phone call directed to a callee 22 within T-Network 14, while CDR 32 of terminating network recorded the same phone call as a local call, this discrepancy is an indication that T-Network 14 was defrauded of the international call termination fee by one of transit operators 24. In step 114, CNCIF classifies the incoming phone call improperly recorded as a domestic call as an instance of international call bypass telecommunications fraud.

The information from both CDRs 30 and 32 associated with such phone call is saved for further investigation to determine which transit operator 24 is the perpetrator of the fraud. It is in the best interest of both O-Network 12 and T-Network 14 to work together to identify transit operator 24 committing the bypass fraud. CNCIF 10 merges all available interconnect information and routing information of both originating and terminating network operators 16 and 18 to facilitate the investigation.

In an embodiment, CNCIF 10 is configured to analyze the instances of international call bypass telecommunications fraud to identify which transit operator 24 is involved in a threshold number of instances of bypass fraud. Once such transit operator 24 is identified, legal action and remedial measures can be implemented. For examples, both originating operator and terminating operator can blacklist transit operator 24 from routing any international calls between these operators. In an embodiment, automatically generated calls from O-Network 12 to T-Network 14 can be used to increase the sampling size of the identified instances of bypass fraud.

Software and Hardware Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method of identifying instances of international call interconnect bypass telecommunications fraud, the method comprising:
    providing a cross-network call identifying routine deployed within an originating telecommunications network or a terminating telecommunications network, wherein the originating telecommunications network and the terminating telecommunications network are located in different countries and wherein a plurality of transit operators routes a phone call from a caller in the originating telecommunications network to a callee in the terminating telecommunications network, the cross-network call identifying routine configured to execute the steps comprising:
        establishing a first network connection with a first server having a first call details record (CDR) of the originating telecommunications network stored thereon;
        accessing the first CDR and identifying therein an outgoing call from the caller registered in the originating telecommunications network to the callee registered in the terminating telecommunications network, the callee having a first identifier associated therewith;
        establishing a second network connection with a second server having a second CDR of the terminating telecommunications network stored thereon;
        accessing the second CDR and querying the second CDR for a record of an incoming call corresponding to the outgoing call based on the first identifier of the callee;
        responsive to identifying, within the second CDR, the record of the incoming call corresponding to the first identifier of the callee, determining whether the incoming call is recorded within the second CDR as a local call or an international call;
        responsive to determining that the incoming call is recorded in the second CDR as the local call, identifying the incoming call as an instance of the international call interconnect bypass telecommunications fraud; and
        automatically transmitting a communication to a network administrator notifying the network administrator of the instance of the international call interconnect bypass fraud associated with the incoming call.

2. The method of claim 1, wherein prior to identifying the incoming call as the instance of the international call interconnect bypass telecommunications fraud, verifying whether time information corresponding to the outgoing call matches time information corresponding to the incoming call, the time information being selected from the group consisting of a call duration, a call origination time, a call termination time, and a combination thereof.

3. The method of claim 2, wherein the step of verifying whether the time information corresponding to the outgoing call matches the time information corresponding to the incoming call comprises:
    obtaining, from the first CDR, the time information corresponding to the outgoing call;
    obtaining, from the second CDR, the time information corresponding to the incoming call; and
    determining whether the time information corresponding to the outgoing call matches the time information corresponding to the incoming call.

4. The method of claim 1, wherein the cross-network call identifying routine identifies, within the plurality of the transit operators, a first transit operator that committed the international call interconnect bypass telecommunications fraud.

5. The method of claim 4, wherein the first transit operator is identified by analyzing multiple instances of the international call interconnect bypass telecommunications fraud in which the first transit operator is one of the plurality of the transit operators involved in routing the phone call.

6. The method of claim 4, wherein the first transit operator is excluded from the plurality of the transit operators for routing of subsequent phone calls.

7. A method of identifying instances of international call interconnect bypass telecommunications fraud committed by a first transit operator within a plurality of transit operators used to route an international phone call from a caller in an originating telecommunications network to a callee in a terminating telecommunications network, wherein the originating telecommunication network and the terminating telecommunications network serve different countries, the method comprising:
    establishing a first network connection with a first server having a first call details record (CDR) of the originating telecommunications network stored thereon;
    accessing the first CDR and identifying therein an outgoing call from the caller registered in the originating telecommunications network to the callee registered in the terminating telecommunications network, the callee having a first identifier associated therewith;
    establishing a second network connection with a second server having a second CDR of the terminating telecommunications network stored thereon;
    accessing the second CDR;
    querying the second CDR for a record of an incoming call corresponding to the outgoing call based on the first identifier of the callee;
    responsive to identifying, within the second CDR, the record of the incoming call corresponding to the first identifier of the callee, determining whether the incoming call is recorded within the second CDR as a local call or an international call;
    responsive to determining that the incoming call is recorded in the second CDR as the local call, identifying the incoming call as an instance of the international call interconnect bypass telecommunications fraud;
    identifying, within the plurality of the transit operators, the first transit operator that committed the international call interconnect bypass telecommunications fraud; and
    automatically excluding the first transit operator from the plurality of the transit operators for routing of subsequent phone calls.

8. The method of claim 7, wherein prior to identifying the incoming call as the instance of the international call interconnect bypass telecommunications fraud, verifying whether time information corresponding to the outgoing call matches time information corresponding to the incoming call, the time information being selected from the group consisting of a call duration, a call origination time, a call termination time, and a combination thereof.

9. The method of claim 8, wherein the step of verifying whether the time information corresponding to the outgoing call matches the time information corresponding to the incoming call comprises:
 obtaining, from the first CDR, the time information corresponding to the outgoing call;
 obtaining, from the second CDR, the time information corresponding to the incoming call; and
 determining whether the time information corresponding to the outgoing call matches the time information corresponding to the incoming call.

10. The method of claim 7, wherein the first transit operator is identified by analyzing multiple instances of the international call interconnect bypass telecommunications fraud in which the first transit operator is one of the plurality of the transit operators involved in routing the phone call.

11. The method of claim 7, automatically transmitting a communication to a network administrator notifying the network administrator of the instance of the international call interconnect bypass telecommunications fraud associated with the incoming call.

12. A method of using a cross-network call identifying routine for identifying instances of international call interconnect bypass telecommunications fraud committed by a first transit operator within a plurality of transit operators used to route an international phone call from a caller in an originating telecommunications network to a callee in a terminating telecommunications network, wherein the originating telecommunication network and the terminating telecommunications network serve different countries and wherein the cross-network call identifying routine is deployed within the originating telecommunications network or the terminating telecommunications network, the method comprising:
 establishing a first network connection with a first server having a first call details record (CDR) of the originating telecommunications network stored thereon;
 accessing the first CDR and identifying therein an outgoing call from the caller registered in the originating telecommunications network to the callee registered in the terminating telecommunications network, the callee having a first identifier associated therewith;
 establishing a second network connection with a second server having a second CDR of the terminating telecommunications network stored thereon;
 accessing the second CDR;
 querying the second CDR for a record of an incoming call corresponding to the outgoing call based on the first identifier of the callee;
 responsive to identifying, within the second CDR, the record of the incoming call corresponding to the first identifier of the callee, determining whether the incoming call is recorded within the second CDR as a local call or an international call;
 responsive to determining that the incoming call is recorded in the second CDR as the local call, identifying the incoming call as an instance of the international call interconnect bypass telecommunications fraud; and
 automatically transmitting a communication to a network administrator notifying the network administrator of the instance of the international call interconnect bypass telecommunications fraud associated with the incoming call.

13. The method of claim 12, wherein prior to identifying the incoming call as the instance of the international call interconnect bypass telecommunications fraud, verifying whether time information corresponding to the outgoing call matches time information corresponding to the incoming call, the time information being selected from the group consisting of a call duration, a call origination time, a call termination time, and a combination thereof.

14. The method of claim 13, wherein the step of verifying whether the time information corresponding to the outgoing call matches the time information corresponding to the incoming call comprises:
 obtaining, from the first CDR, the time information corresponding to the outgoing call;
 obtaining, from the second CDR, the time information corresponding to the incoming call; and
 determining whether the time information corresponding to the outgoing call matches the time information corresponding to the incoming call.

15. The method of claim 12, wherein the cross-network call identifying routine is configured to identify, within the plurality of the transit operators, the first transit operator that committed the international call interconnect bypass telecommunications fraud.

16. The method of claim 15, wherein the first transit operator is identified by analyzing multiple instances of the international call interconnect bypass telecommunications fraud in which the first transit operator is one of the plurality of the transit operators involved in routing the phone call.

17. The method of claim 15,
 wherein the first transit operator is excluded from the plurality of the transit operators for routing of subsequent phone calls.

* * * * *